(12) United States Patent
Berceanu et al.

(10) Patent No.: US 7,547,207 B2
(45) Date of Patent: Jun. 16, 2009

(54) COOLING ARRANGEMENT FOR CENTERING DEVICE AND SPLINE SHAFT

(75) Inventors: Mihai Berceanu, Thornhill (CA); Jeffrey Ngai, Markham (CA); Filippo Martino, Mississauga (CA); Vincent Travaglini, Maple (CA); Kyung-Tae Lee, Toronto (CA); Gary Fong, North York (CA)

(73) Assignee: Stack Teck Systems Ltd., Brampton, Ontario (CA)

( * ) Notice: Subject to any disclaimer, the term of this patent is extended or adjusted under 35 U.S.C. 154(b) by 260 days.

(21) Appl. No.: 11/695,409

(22) Filed: Apr. 2, 2007

(65) Prior Publication Data

US 2007/0275111 A1 Nov. 29, 2007

(30) Foreign Application Priority Data

May 23, 2006 (CA) .................................. 2547475

(51) Int. Cl.
*B29C 45/74* (2006.01)
(52) U.S. Cl. .................. 425/547; 425/572; 425/588
(58) Field of Classification Search .................. 425/547, 425/548, 572, 588, 589
See application file for complete search history.

(56) References Cited

U.S. PATENT DOCUMENTS

| | | | |
|---|---|---|---|
| 5,707,666 A * | 1/1998 | DiSimone et al. ........... | 425/588 |
| 5,908,597 A * | 6/1999 | Boudreau et al. ........... | 425/588 |
| 5,910,327 A * | 6/1999 | Schad et al. ................. | 425/572 |
| 6,089,852 A | 7/2000 | Lee et al. | |
| 6,575,731 B1 * | 6/2003 | Olaru et al. .................. | 425/588 |
| 6,852,265 B2 * | 2/2005 | Olaru et al. .................. | 425/572 |

* cited by examiner

*Primary Examiner*—Tim Heitbrink
(74) *Attorney, Agent, or Firm*—Volpe and Koenig PC

(57) ABSTRACT

A cooling arrangement is provided for a mold centering device for multi-level stack molds having a spline shaft with a central region journaled to an intermediate mold level with involute spline pathways extending in oppositely twisting helices from the central region toward opposite ends thereof and respective spline nuts secured to adjacent mold levels threadedly engaging the spline pathways to run therealong for converting linear motion into rotational motion and vice versa thereby controlling relative opening and closing rates of the adjacent mold levels relative to the intermediate mold levels therebetween. The cooling arrangement has an internal fluid passageway extending along the spline shaft into a region of the spline shaft received in the spline nuts. A fluid inlet communicates with and supplies fluid to the fluid passageway. A fluid outlet communicates with and discharges fluid from the fluid passageway. A fluid guide is provided for causing a fluid to flow along the fluid passageway to cool the region received in the spline nuts as the fluid passes from the inlet through the outlet.

7 Claims, 3 Drawing Sheets

Fig 1 'PRIOR ART'

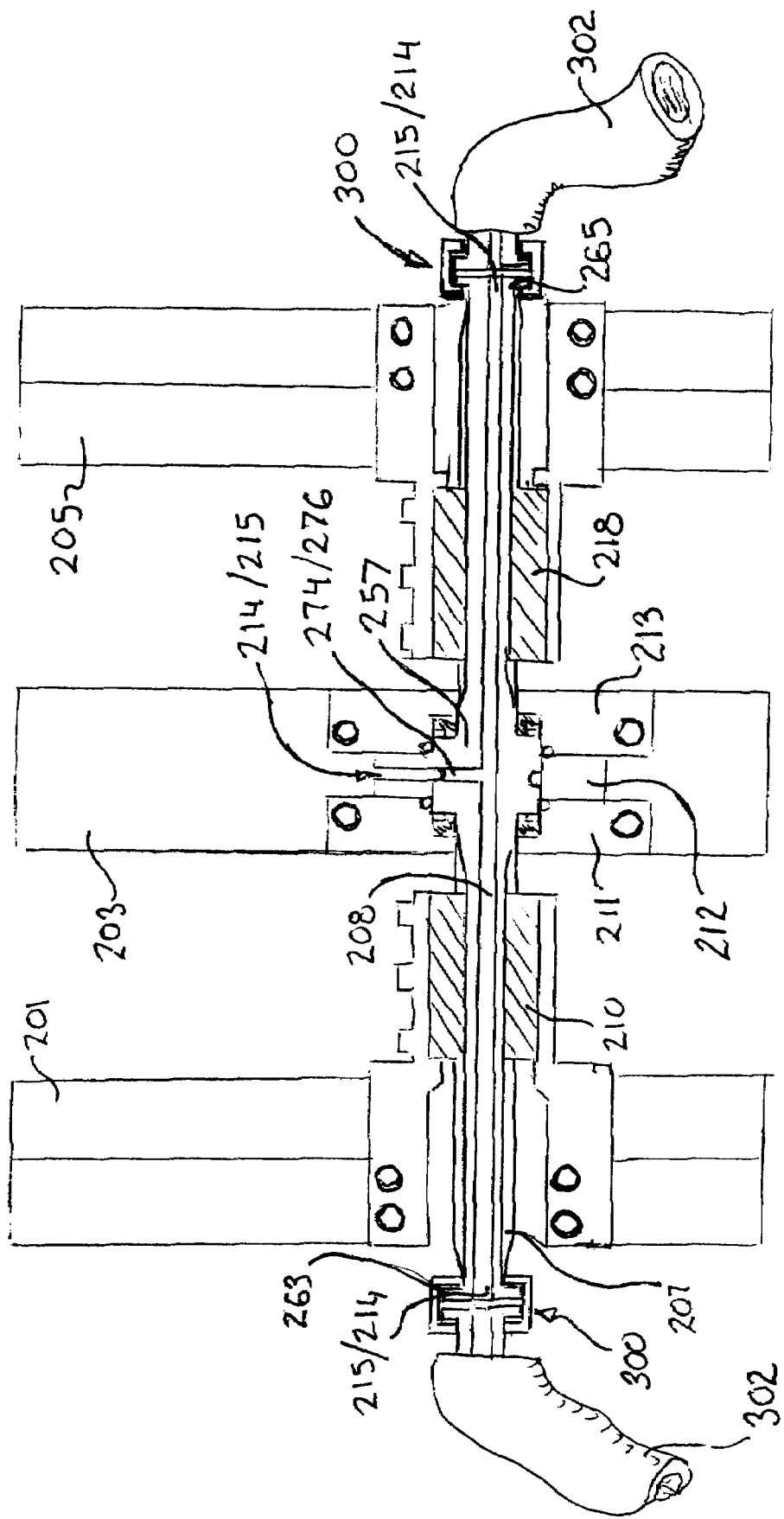

COOLING ARRANGEMENT FOR CENTERING DEVICE AND SPLINE SHAFT

FIELD OF THE INVENTION

This invention relates generally to injection molding apparatus and more particularly to injection molding apparatus having multi-level stack molds. Still more particularly, this invention relates to centering devices for such multi-level stack molds and in particular centering devices utilizing spline shaft and spline nut arrangements.

BACKGROUND OF THE INVENTION

A typical injection molding machine has a movable platen and a fixed platen. The movable platen is moved toward the fixed platen for closing the mold and away from the fixed platen for opening the mold. Where part configuration and space permits, a plurality of mold levels may be interspersed between the fixed and movable platen. A mold level is basically a core and cavity set, with the core and cavity defining a space therebetween in the mold closed configuration for receiving melt to form an injection molded part. Molds having a plurality of mold levels are referred to as "stack molds" as the core and cavity sets are in effect "stacked" between the fixed and movable platens.

Mold opening and closing requires that the mold levels be synchronized in opening and closing to generally have the core and cavity sets spaced apart by equidistant amounts when the mold is open. In some circumstances, where different parts are being molded in the different levels, other spacings may be desirable. In any case, a device is required to synchronize the mold opening and closing. Such devices are referred to as "centering devices".

A variety of centering devices exist including lever arm arrangements, rack and pinion arrangements and spline shaft and nut arrangements. The latter are the type at which the present invention is directed. Typical spline shaft and nut arrangements are described in U.S. Pat. No. 6,089,852.

FIG. 1 is a schematic representation of a typical centering device.

A first mold plate 101 would be affixed to a movable platen of an injection molding machine (not illustrated). A fifth mold plate 105 would be mounted to a fixed platen of an injection molding machine (also not illustrated). A third mold plate 103 is mounted between the first mold plate 101 and fifth mold plate 105. Were this a two-level stack mold, this would represent the entire molding assembly. Three and four-level stack molds are however also known. The full arrangement illustrated includes a second mold plate 102 interspersed between the first mold plate 101 and the third mold plate 103. The arrangement further includes a fourth mold plate 104 interspersed between the third mold plate 103 and the fifth mold plate 105.

A spline shaft 107 is secured to the third mold plate 103 by brackets 110 and 114. The spline shaft 107 is journaled in bearings 111 and 112 to permit axial rotation while restraining longitudinal movement relative to the third mold plate 103. The spline shaft would be provided with involute or helical splines which wind in opposite directions (oppositely twisting helices) from a central region of the spline shaft journaled in the bearings 111 and 112 toward opposite ends of the spline shaft. Respective spline nuts 109 and 115 having corresponding teeth for threadedly engaging the spline shaft 107 are secured respectively to the first mold plate 101 and the fifth mold plate 105 by respective brackets 106 and 116. In a four-level mold, relative movement of the second plate 102 and the fourth plate 104 may be controlled with similar but shorter spline shaft and nut arrangements in which a respective second spline shaft is secured to the second level 102 and a third spline shaft is secured to the fourth level 104. The above U.S. patent discusses various arrangements which may be used.

In the arrangement illustrated in FIG. 1, as the first plate 101 is moved away from the fifth plate 105 the spline nut 109 is pulled along the spline shaft 107 causing the shaft to rotate and to pull plate 103 to the left as illustrated as the spline teeth extract themselves from the second spline nut 115. In effect, the arrangement converts linear motion into rotational motion and vice versa to control the mold opening and closing for multi-level molds.

In larger molds with shorter cycle times, significant loads and stress are applied to the centering device. As the spline nuts 109 and 115 run along the involute splines of the spline shaft 107, frictional heating occurs which is transmitted to the spline shaft 107. Over time, particularly in larger applications, the spline shaft 107 may become hot and pose a potential risk to operators.

Another factor to consider is wear of the spline nuts. In general, the spline nuts 109 and 115 would be made of nylon or comparable polymeric material which eventually get eroded by the spline shaft 107 which itself is typically of metal. The frictionally generated heat enhances the rate of wear of the spline nuts 109 and 115.

It is an object of the present invention to provide a spline shaft that is relatively cool to the touch and avoids heating up during mold operation.

SUMMARY OF THE INVENTION

In very general terms, the invention provides for cooling a spline shaft by providing the spline shaft with coolant passages along which a coolant fluid may be passed to remove heat from the spline shaft.

More particularly, a cooling arrangement is provided for a mold centering device for multi-level stack molds having a spline shaft with a central region journaled to an intermediate mold level with involute spline pathways extending in oppositely twisting helices from the central region toward opposite ends thereof and respective spline nuts secured to adjacent mold levels threadedly engaging the spline pathways to run therealong for converting linear motion into rotational motion and vice versa thereby controlling relative opening and closing rates of the adjacent mold levels relative to the intermediate mold levels therebetween. The cooling arrangement has an internal fluid passageway extending along the spline shaft into a region of the spline shaft received in the spline nuts. A fluid inlet communicates with and supplies fluid to the fluid passageway. A fluid outlet communicates with and discharges fluid from the fluid passageway. Fluid guide means are provided for causing the fluid to flow along the fluid passageway to cool the region received in the spline nuts as the fluid passes from the inlet through the outlet.

The inlet and the outlet may be adjacent the central region and each may have a respective channel extending circumferentially about the spline shaft for directing the fluid about the spline shaft. Respective fluid conduits are provided for enabling fluid communication between the channel and the fluid passageway. The channels are covered by a sleeve extending thereabout. The inlet and outlet may extend through the sleeve to fluidly communicate with the respective channels. Sealing means may be provided between the sleeve and the central region on opposite sides of the respective channels to avoid fluid leakage along the spline shaft between the sleeve and the central region.

The fluid guide means may be provided by configuring the fluid passage to have a first run along the spline shaft from the inlet toward the ends and a second run from the ends toward the outlet, with the first and second runs fluidly communicating toward the ends.

The fluid passage may be a single passage divided into the first and second runs by a baffle member extending therealong.

Alternatively, the first and second runs may be provided by generally parallel bores formed in the spline shaft.

The fluid passage may alternatively extend between opposite ends of the spline shaft with a fluid guide means being effected by providing the inlet at one end of the spline shaft and the outlet at the opposite end of the spline shaft to pass fluid along the length of the spline shaft. Rotating unions may be provided at the fluid inlet and the fluid outlet to fluidly seal the inlet and the outlet while permitting rotation of the spline shaft.

In yet another embodiment, the fluid passage may extend between opposite ends of the spline shaft with respective rotating unions being provided at the opposite ends to provide fluid communication with the fluid passage through the ends while permitting the spline shaft to rotate without fluid leakage therebetween. A channel may extend circumferentially about the spline shaft in the central region. A fluid conduit may extend from the channel to the fluid passage to provide fluid communication between the channel and the fluid passageway. A sleeve may extend about the channel to cover the channel with sealing means being provided between the sleeve and the spline shaft to either side of the channel to allow rotation of the spline shaft in the sleeve while avoiding fluid leakage along the spline shaft between the spline shaft and the sleeve. The arrangement may be provided with a respective inlet at each end of the spline shaft and an outlet which extends through the sleeve to fluidly communicate with the channel. Alternatively the inlet may be provided through the sleeve to fluidly communicate with the channel and the outlet may be provided at the ends of the spline shaft. Rotary unions would be provided at the ends of the spline shaft to permit rotation of the spline shaft without leakage.

DESCRIPTION OF DRAWINGS

Preferred embodiments of the present invention are described below with reference to the accompanying illustrations in which:

FIG. 3 is a schematic illustration of an alternate embodiment for a cooling arrangement for a mold centering device according to the present invention.

DESCRIPTION OF PREFERRED EMBODIMENTS

Figure 1:
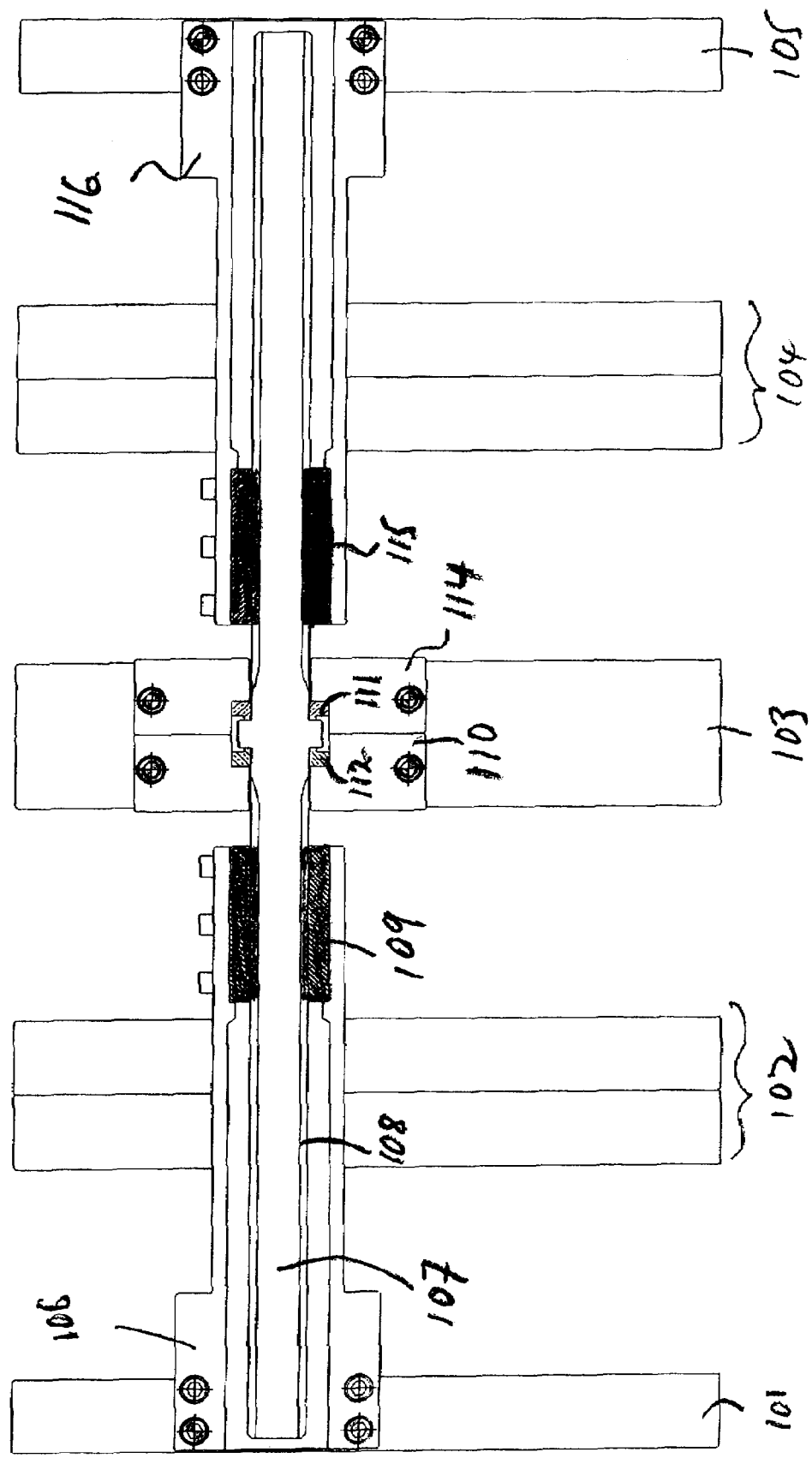
FIG. 1 is a schematic representation of a prior art centering device.
Figure 2:
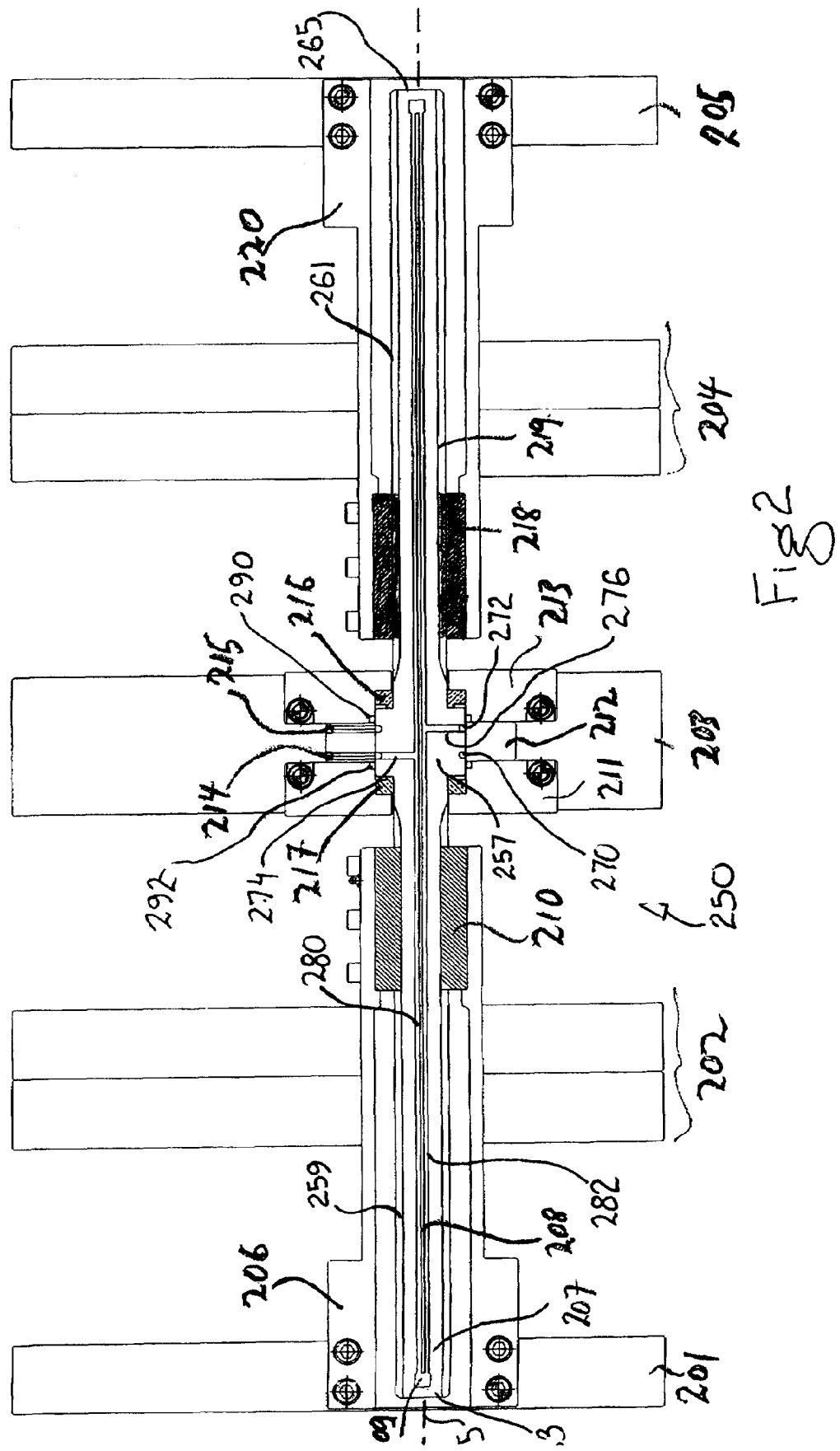
FIG. 2 is a schematic representation of a cooling arrangement for a mold centering device according to the present invention.

FIG. 2 illustrates a support arrangement for a four-level stack mold having first, second, third, fourth and fifth mold plates, 201, 202, 203, 204 and 205 respectively. Each pair of adjacent mold plates of the mold plates 201 and 205 would support a core part and a cavity part of an injection mold in known arrangement. The core parts and cavity parts are not illustrated in FIG. 2.

The first mold plate 201 would be secured to a movable platen of an injection molding machine (not illustrated) and the fifth mold plate 205 would be secured to a stationary platen of an injection molding machine. FIG. 2 illustrates the mold support assembly in a closed configuration. The assembly would be movable to a mold open configuration by moving the end plate 201 to the left as illustrated in FIG. 2. Were this a two-level stack mold, the second and fourth mold plates 202 and 204 would be absent.

A centering device according to the present invention is generally indicated by reference 250. The centering device includes a spline shaft 207 which is journaled in bearings 216 and 217 secured to the third mold plate 203 by brackets 211 and 213. The spline shaft is free to rotate about a longitudinal axis 255 but otherwise restrained from movement relative to the third mold plate 203. The spline shaft has a central region 257 which is journaled in the bearings 216 and 217. Involute spline pathways 259 and 261 extend in respective opposite twisting helices from the central region toward opposite ends 263 and 265 of the spline shaft 207.

Spline nuts 210 and 218 threadedly engage the spline pathways 259 and 261 respectively. The spline nuts 210 and 218 are secured respectively to the first plate 201 and fifth plates 205 by spline nut housings 206 and 220. The spline nuts 210 and 218 are secured against rotation in the respective spline nut housings 206 and 220. Accordingly it will be appreciated that rotational movement of the spline shaft 207 about its axis 255 cannot occur without lateral movement of the spline nuts 210 and 218 toward or away from each other. Assuming that the spline pathways 259 and 261 have a similar pitch, albeit opposite rotations (i.e. thread in opposition directions), the central region 257 of the spline shaft 207 will remain centered between the spline nuts 210 and 218. Accordingly as the first mold plate 201 is moved away from the fifth mold plate 205 by virtue of movement of the movable machine platen, the third mold plate 203 will remain centered therebetween, hence the term "centering device".

In order to cool the spline shaft 207, an internal fluid passageway 209 is provided extending substantially the length of the spline shaft 207 and in particular within the region traversed by (received in) the spline nuts 210 and 218.

In the arrangement illustrated in FIG. 2, the spline shaft 207 has an inlet channel 270 and an outlet channel 272 extending circumferentially thereabout. The region of the spline shaft 207 having the inlet channel 270 and 272 is covered by a sleeve 212. The sleeve 212 acts as a cover over the inlet channel 270 and outlet channel 272.

A fluid inlet 214 extends through the sleeve 212 and fluidly communicates with the inlet channel 270. An outlet 215 extends through the sleeve 212 to fluidly communicate with the outlet channel 272. The inlet channel 270 receives fluid from the inlet 214 and directs it about the spline shaft 207. An inlet fluid conduit 274 provides fluid communication between the inlet channel 270 and the fluid passage 209.

An outlet conduit 276 provides fluid communication between the fluid passage 209 and the outlet channel 272. The outlet channel 272 directs fluid circumferentially about the spline shaft 207 to the outlet 215 from where fluid may be discharged.

In order to prevent short circuiting of fluid between the inlet and the outlet within the central region 257, means are provided for directing fluid from the central region toward the respective ends 255 and 265 and returning thereto prior to discharge. The fluid guide means may comprise a baffle 208 as illustrated in FIG. 2 which is received within the fluid passage 209 to divide the fluid passage 209 into a first run 280 which receives fluid from the inlet 214 and directed toward the ends 263 and 265 and a second run 282 which returns fluid from the ends 263 and 265 toward the central region 257 delivering it to the outlet 215. The first run 280 and second run 282 fluidly communicate towards the ends 255 and 265 of the spline shaft 207.

As an alternate to having one fluid passage bifurcated with a baffle member 208, the first run 280 and second run 282 could be drilled as separate but parallel bores extending along the spline shaft 207 and fluidly communicate toward the ends 263 and 265.

In order to prevent fluid leakage between the sleeve 212 and the central region 257, suitable sealing means such as the O ring seals 290 and 292 illustrated and may be provided outboard of the inlet channel 270 and outlet channel 272 between the sleeve 212 and the central region 257. It will be appreciated that, as illustrated, the sleeve may extend into the bearing support brackets 211 and 213.

FIG. 2 illustrates one manner in which fluid may be routed through the spline shaft 207. FIG. 3 is illustrated as a two-level stack mold. Common reference numerals are used for common elements and the above description is referred to for their explanation.

The cooling arrangement discussed above with reference to FIG. 2 in effect provides coolant in the central region 257 from whence it is directed toward the ends 263 and 265 of the spline shaft 207 and back toward the central region for discharge.

As an alternative and as illustrated in FIG. 3, other coolant distribution arrangements are possible. For example, the passage 209 may extend through the ends of the spline shaft 207 and coolant may be fed directly through the spline shaft 207 between its ends 263 and 265. This may be accomplished for example by providing a rotary union 300 at each end 263 and 265 providing a fluid inlet 214 at one of the ends 263, 265 and providing the fluid outlet 215 at the other of the ends 263, 265. In this manner, fluid is introduced at the inlet 214 flows along the fluid passageway and out of the outlet at the opposite end of the spline shaft 207.

Bearing in mind that the spline shaft 207 moves axially during mold opening and closing, accommodation must be made for the spline shaft movement. This may for example be accomplished by using flexible hoses 302 connected to the rotary unions 300 which flex and move in order to accommodate movement of the spline shaft 207.

Alternatively, and as also illustrated in FIG. 3, an inlet 214 or outlet 215 may be provided adjacent the central region 257 in a manner similar to that illustrated in FIG. 2 but with only one fluid passage 274, 276 (depending on whether it is an inlet or an outlet). In this embodiment, fluid may be introduced into the ends 263, 265 of the spline shaft 207 and discharged from the central region 257 or vice versa.

In the arrangement illustrated in FIG. 2, fluid may either be piped in through the mold plates, such as the third plate 203, directly or as a separately connected hose external to the mold plates.

It is expected that in a majority of applications water would be used as the coolant fluid. In some applications however it may be desirable to utilize a gaseous coolant hence the reference to "fluid" rather than specifying liquid or gas.

The above description is intended in an illustrative rather than a restrictive sense bearing in mind that variations to the specific embodiments described may be apparent to persons skilled in such apparatus and systems without departing from the inventive concept as defined by the claims set out below.

The invention claimed is:

1. A cooling arrangement for a mold centering device for multi-level stack molds having a spline shaft with a central region journaled for axial rotation to an intermediate mold level with involute spline pathways extending in oppositely twisting helices from said central region toward opposite ends thereof and respective spline nuts secured to adjacent mold levels threadedly engaging said spline pathways to run therealong for converting linear motion into rotational motion and vice versa thereby controlling relative opening and closing rates of said adjacent mold levels relative to said intermediate mold level therebetween, said cooling arrangement comprising:

an internal fluid passageway extending along said spline shaft into a region of said spline shaft received in said spline nuts;
a fluid inlet communicating with and for supplying fluid to said fluid passageway;
a fluid outlet communicating with and for discharging said fluid from said fluid passageway; and,
fluid guide means for causing said fluid to flow along said fluid passageway to cool said region received in said spline nuts in passing from said inlet through said outlet.

2. The cooling arrangement of claim 1 wherein:

said inlet and said outlet are adjacent said central region and each comprises a respective channel extending circumferentially about said spline shaft for directing said fluid about said spline shaft and a fluid conduit providing fluid communication between said channel and said fluid passageway;
said channels are covered by a sleeve extending thereabout;
said inlet and said outlet extend through said sleeve to fluidly communicate with said respective channels;
sealing means are provided between said sleeve and said central region on outboard of said respective channels to avoid fluid leakage along said spline shaft beyond said sleeve and said central region.

3. The cooling arrangement of claim 2 wherein:

said fluid guide means is provided by configuring said fluid passage to have a first run along said spline shaft from said inlet toward said ends and a second run from said ends toward said outlet, said first and second runs fluidly communicating toward said ends.

4. The cooling arrangement of claim 3 wherein said fluid passage is a single passage divided into said first and second runs by a baffle member extending therealong.

5. The cooling arrangement of claim 3 wherein said first and second runs are provided by generally parallel bores formed in said spline shaft.

6. The cooling arrangement of claim 1 wherein:

said fluid passage extends between opposite ends of said spline shaft;
said fluid guide means is effected by providing said inlet at one end of said spline shaft and said fluid outlet at the opposite end of said spline shaft; and,
rotating unions are provided at said fluid inlet and said fluid outlet to fluidly seal said inlet and said outlet while permitting rotation of said spline shaft.

7. The cooling arrangement of claim 1 wherein:

said fluid passageway extends between opposite ends of said spline shaft;
respective rotating unions are provided at said opposite ends to provide fluid communication with said fluid passage through said ends while permitting said spline shaft to rotate axially without fluid leakage therebetween;
a channel extends circumferentially about said spline shaft in said central region;
a fluid conduit extends from said channel to said fluid passageway to provide fluid communication between said channel and said fluid passageway;
a sleeve extends about said channel to cover said channel;
sealing means are provided between said sleeve and said spline shaft to either side of said channel to allow rotation of said spline shaft in said sleeve while avoiding fluid leakage along said spline shaft beyond said spline shaft and said sleeve;

one of said inlet and said outlet extends through said sleeve to fluidly communicate with said channel;

the other of said inlet and said outlet fluidly communicates with said fluid passage through said rotary unions provided at both ends of said spline shaft.

* * * * *